(12) United States Patent
Yamamoto et al.

(10) Patent No.: US 11,884,049 B2
(45) Date of Patent: Jan. 30, 2024

(54) FOIL TRANSFER APPARATUS

(71) Applicant: Brother Kogyo Kabushiki Kaisha, Nagoya (JP)

(72) Inventors: Tomoya Yamamoto, Kasugai (JP); Kentaro Mori, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/449,698

(22) Filed: Oct. 1, 2021

(65) Prior Publication Data

US 2022/0105717 A1  Apr. 7, 2022

(30) Foreign Application Priority Data

Oct. 6, 2020  (JP) ................................. 2020-168834

(51) Int. Cl.
*B32B 37/06*  (2006.01)
*B32B 37/00*  (2006.01)

(52) U.S. Cl.
CPC .......... *B32B 37/0053* (2013.01); *B32B 37/06* (2013.01); *B32B 2309/72* (2013.01)

(58) Field of Classification Search
CPC .......................... B32B 37/0053; B32B 37/025
See application file for complete search history.

(56) References Cited

U.S. PATENT DOCUMENTS

| 4,060,441 A | * | 11/1977 | Ohta | ................ | B29C 66/82263 |
| | | | | | 427/152 |
| 6,095,220 A | * | 8/2000 | Kobayashi | .......... | B32B 37/0015 |
| | | | | | 156/540 |
| 2019/0317449 A1 | * | 10/2019 | Hasegawa | ............ | G03G 21/206 |

FOREIGN PATENT DOCUMENTS

JP  2020-121467 A  8/2020

* cited by examiner

*Primary Examiner* — Philip C Tucker
*Assistant Examiner* — John Blades
(74) *Attorney, Agent, or Firm* — BURR PATENT LAW, PLLC (57) ABSTRACT

A foil transfer apparatus that transfers foil of a foil film to a sheet, including: a heating member and a pressurizing member that nip the foil film and the sheet; a movable frame supporting one of the heating member and the pressurizing member and movable between a first position at which the one of the heating member and the pressurizing member is located at a contact position so as to contact the foil film in a mounted state in which the foil film is mounted on a housing body and a second position at which the one of the heating member and the pressurizing member is located at a spaced position so as to be spaced from the foil film in the mounted state; a cam that moves the movable frame between the first position and the second position; and a sensor that detects a position of the movable frame.

15 Claims, 10 Drawing Sheets

FIG.10

FOIL TRANSFER APPARATUS

CROSS REFERENCE TO RELATED APPLICATION

The present application claims priority to Japanese Patent Application No. 2020-168834, which was filed on Oct. 6, 2020, the disclosure of which is herein incorporated by reference in its entirety.

BACKGROUND

Technical Field

The following disclosure relates to a foil transfer apparatus configured to transfer foil to a sheet.

Description of Related Art

A conventionally known foil transfer apparatus includes a heating member that heats a foil film and a sheet and a pressurizing member that cooperates with the heating member to nip the foil film and the sheet therebetween. The known foil transfer apparatus includes: a position change mechanism that moves the heating member between a contact position at which the heating member contacts the foil film and a spaced position at which the heating member is spaced apart from the foil film; and a sensor that detects a position of the heating member.

SUMMARY

In the foil transfer apparatus constructed as described above, the sensor for detecting the position of the heating member may be configured to detect a phase of a cam that moves the heating member, for instance. However, in a case where the heating member does not move even though the cam moves, the sensor may fail to accurately detect the position of the heating member.

Accordingly, an aspect of the present disclosure is directed to a technique of accurately detecting a position of a heating member capable of coming into contact with and moving away from a foil film.

In one aspect of the present disclosure, a foil transfer apparatus configured to superpose a sheet on a foil film including foil and to transfer the foil to the sheet includes: a housing body; a heating member configured to heat the foil film and the sheet; a pressurizing member configured to cooperate with the heating member to nip the foil film and the sheet therebetween; a movable frame supporting one of the heating member and the pressurizing member, the movable frame being movable between i) a first position at which the one of the heating member and the pressurizing member is located at a contact position at which the one of the heating member and the pressurizing member is in contact with the foil film in a state in which the foil film is mounted on the housing body and ii) a second position at which the one of the heating member and the pressurizing member is located at a spaced position at which the one of the heating member and the pressurizing member is spaced apart from the foil film in the state in which the foil film is mounted on the housing body; a cam configured to move the movable frame between the first position and the second position; and a sensor configured to detect a position of the movable frame.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1A:
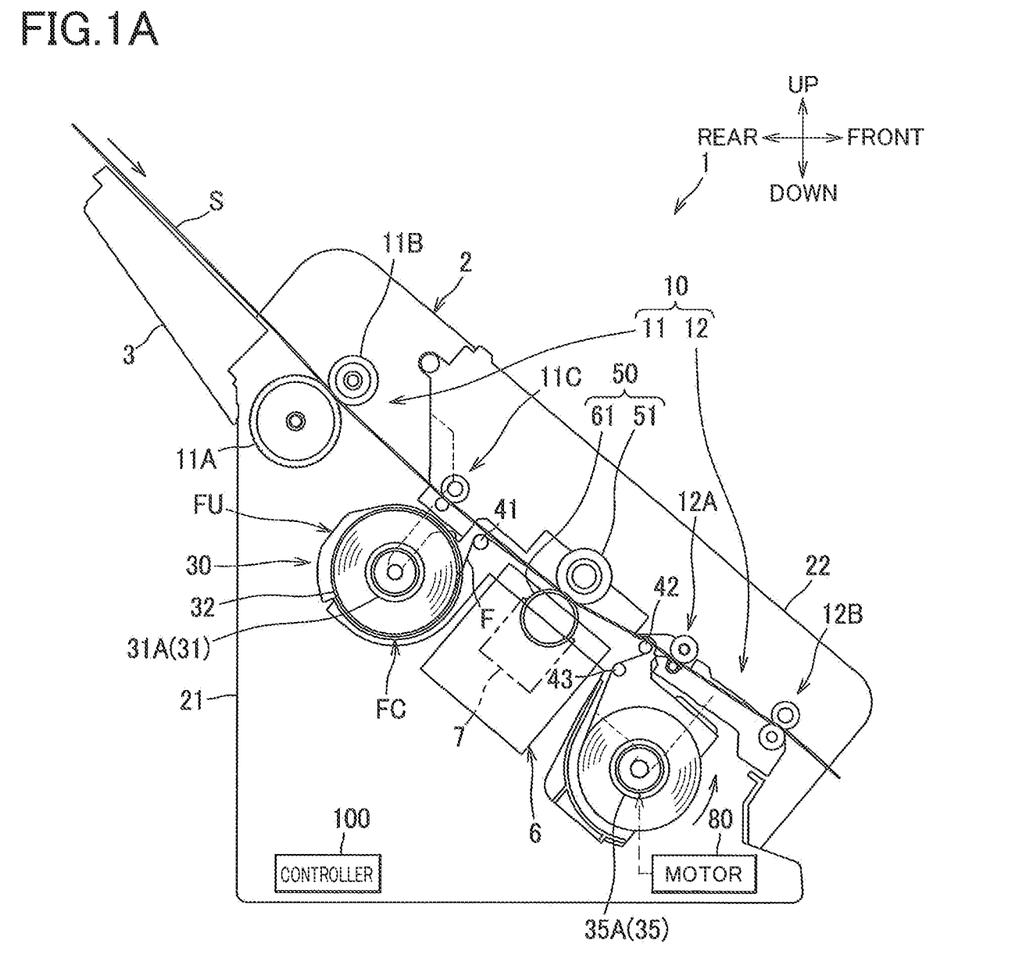
FIG. 1A is a view of a foil transfer apparatus according to one embodiment of the present disclosure.

Referring to the drawings, there will be hereinafter described a foil transfer apparatus according to one embodiment of the present disclosure. In the following description, directions are explained based on directions illustrated in FIG. 1A. That is, a right side and a left side in FIG. 1A are respectively defined as a front side and a rear side of the foil transfer apparatus, and a front side and a rear side of the sheet of FIG. 1A are respectively defined as a left side and a right side of the foil transfer apparatus. An upper side and a lower side in FIG. 1A are respectively defined as an upper side and a lower side of the foil transfer apparatus.

The foil transfer apparatus denoted at 1 in FIG. 1A is configured to superpose a sheet S on a foil film F including foil and to transfer the foil to the sheet S. As illustrated in FIG. 1A, the foil transfer apparatus 1 is configured to transfer the foil such as aluminum on a toner image formed on the sheet S by an image forming apparatus such as a laser printer. The foil transfer apparatus 1 includes a housing 2, a sheet tray 3, a sheet conveyor 10, a film supplier 30, a transfer device 50, and a controller 100 that controls the foil transfer apparatus 1.

Figure 2:
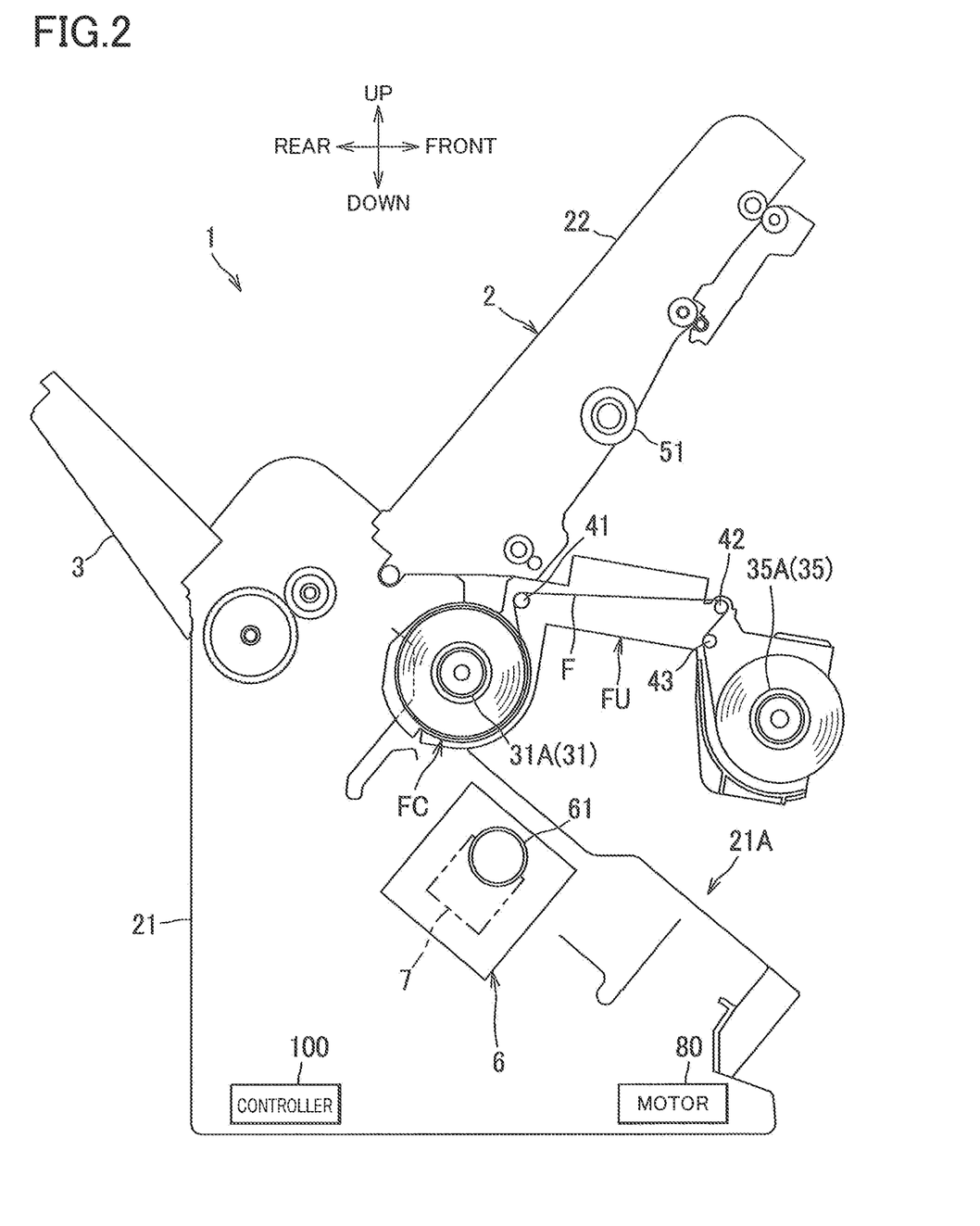
FIG. 2 is a view illustrating the foil transfer apparatus in which a cover is opened.

The housing 2 is formed of a resin, for instance, and includes a housing body 21 and a cover 22. The housing body 21 has, at an upper portion thereof, an opening 21A (FIG. 2). The opening 21A is for mounting and dismounting a film unit FU (that will be described) on and from the housing body 21. The opening 21A faces upward. The cover 22 is a member for opening and closing the opening 21A. The cover 22 is pivotably supported at a rear end portion thereof by the housing body 21. The cover 22 is movable between a closed position at which the cover 22 closes the opening 21A and an open position at which the cover 22 exposes the opening 21A. In the present embodiment, the cover 22 is configured to be opened in a direction different from a conveying direction of the sheet S.

A sheet tray 3 is a tray on which the sheets S such as paper and OHP films are placed. The sheet tray 3 is disposed at a rear portion of the housing 2. Each of the sheets S is placed on the sheet tray 3 such that a surface thereof, on which the toner image has been formed, faces downward.

The sheet conveyor 10 includes a sheet supply mechanism 11 and a sheet discharge mechanism 12. The sheet supply mechanism 11 is configured to convey the sheets S on the sheet tray 3 one by one toward the transfer device 50. The sheet supply mechanism 11 includes a pickup roller 11A, a retard roller 11B, and upstream conveyor rollers 11C.

The pickup roller 11A is configured to supply the sheet S on the sheet tray 3 toward the transfer device 50. The retard roller 11B is for separating one of the sheets S that is to be sent by the pickup roller 11A from the others.

The retard roller 11B is disposed above the pickup roller 11A. The retard roller 11B is rotatable in a direction to return the sheets S superposed on the one of the sheet S that is to be sent by the pickup roller 11A toward the sheet tray 3.

The upstream conveyor rollers 11C are constituted by two rollers. The two rollers are rotated in a state in which the sheet S is nipped therebetween to thereby convey the sheet S. The upstream conveyor rollers 11C are disposed between the pickup roller 11A and the transfer device 50 and convey, to the transfer device 50, the sheet S sent by the pickup roller 11A.

The sheet discharge mechanism 12 is a mechanism for discharging, to outside the housing 2, the sheet S that has passed the transfer device 50. The sheet discharge mechanism 12 includes downstream conveyor rollers 12A (each as one example of a conveyor roller) and discharge rollers 12B.

The downstream conveyor rollers 12A and the discharge rollers 12B are both constituted by two rollers. The two rollers of each of the downstream conveyor rollers 12A and the discharge rollers 12B are rotated in a state in which the sheet S is nipped therebetween to thereby convey the sheet S. The downstream conveyor rollers 12A are located downstream of a second guide shaft 42 (that will be described) in the conveying direction of the sheet S. In the following explanation, the conveying direction of the sheet S will be simply referred to as "conveying direction" where appropriate.

Specifically, the downstream conveyor rollers 12A are rollers that are the closest to the second guide shaft 42 among the plurality of rollers (12A, 12B) for conveying the sheet S that are located downstream of the second guide shaft 42 in the conveying direction. The downstream conveyor rollers 12A are disposed between the second guide shaft 42 and the discharge rollers 12B in the conveying direction. The downstream conveyor rollers 12A convey the sheet S sent from the transfer device 50 toward the discharge rollers 12B.

The discharge rollers 12B are located downstream of the downstream conveyor rollers 12A in the conveying direction. The discharge rollers 12B discharge, to outside the housing 2, the sheet S sent from the downstream conveyor rollers 12A.

The film supplier 30 is configured to supply the foil film F such that the foil film F is superposed on the sheet S conveyed from the sheet supply mechanism 11. The film supplier 30 includes a film unit FU and a motor 80.

The film unit FU is mountable to and dismountable from the housing body 21 from an upper side, as illustrated in FIG. 2. The film unit FU includes a supply reel 31, a take-up reel 35, a first guide shaft 41, the second guide shaft 42 (as one example of a separating member), and a third guide shaft 43 (as one example of an angle defining member). The foil film F is wound around the supply reel 31 of the film unit FU.

Figure 1B:
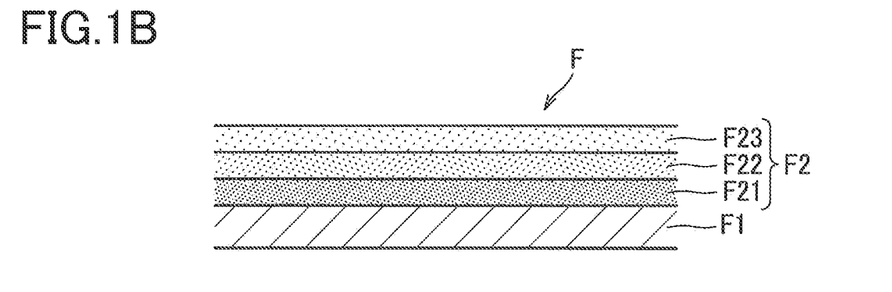
FIG. 1B is a cross-sectional view illustrating a structure of a foil film.

As illustrated in FIG. 1B, the foil film F includes a supporting layer F1 and a supported layer F2. The supporting layer F1 is a tape-like transparent base formed of a high molecular material. The supporting layer F1 supports the supported layer F2.

The supported layer F2 includes a separation layer F21, a transfer layer F22, and an adhesive layer F23. The separation layer F21 is a layer for permitting the transfer layer F22 to be easily peeled off from the supporting layer F1. The separation layer F21 is disposed between the supporting layer F1 and the transfer layer F22. The separation layer F21 contains a transparent material, such as a wax resin, that permits itself to be easily peeled off from the supporting layer F1.

The transfer layer F22 is a layer to be transferred to the toner image. The transfer layer F22 contains foil. The foil is a thin metal such as gold, silver, copper, or aluminum. The transfer layer F22 contains a thermoplastic resin and a colorant such as a gold colorant, a silver colorant, or a red colorant. The transfer layer F22 is disposed between the separation layer F21 and the adhesive layer F23.

The adhesive layer F23 is a layer for permitting the transfer layer F22 to be easily bonded to the toner image. The adhesive layer F23 contains a material, such as a polyvinyl chloride resin or an acrylic resin, that is easily bonded to the toner image heated by the transfer device 50 (that will be described).

As illustrated in FIG. 1A, the supply reel 31 is formed of a resin or the like and includes a supply shaft portion 31A around which the foil film F is wound. The take-up reel 35 is formed of a resin or the like and includes a take-up shaft portion 35A around which the foil film F is taken up. A load apply mechanism, not illustrated, is provided for the supply reel 31. The load apply mechanism generates a frictional force between the supply reel 31 and a supply case 32 that rotatably supports the supply reel 31, thereby applying a load torque to the supply reel 31. The load torque is applied to the supply reel 31, so that the foil film F is tensioned when taken up by the take-up reel 35.

For convenience sake, FIG. 1A, etc., illustrate a state in which the foil film F is wound around both the supply reel 31 and the take-up reel 35 to a maximum extent. Actually, in a new condition of the film unit FU, the diameter of the roll-like foil film F wound around the supply reel 31 is maximum while the foil film F is not wound around the take-up reel 35 or the diameter of the roll-like foil film F wound around the take-up reel 35 is minimum. On the other hand, when the film unit FU reaches the end of its life, namely, when the foil film F is used up, the diameter of the roll-like foil film F wound around the take-up reel 35 is maximum while the foil film F is not wound around the supply reel 31 or the diameter of the roll-like foil film F wound around the supply reel 31 is minimum.

Each of the first guide shaft 41, the second guide shaft 42, and the third guide shaft 43 is a shaft shaped like a roller for changing a moving direction of the foil film F. The first guide shaft 41, the second guide shaft 42, and the third guide shaft 43 are formed of SUS (stainless steel), for instance.

The first guide shaft 41 is located upstream of the transfer device 50 in the conveying direction of the sheet S. The first guide shaft 41 changes the moving direction of the foil film F drawn from the supply reel 31 so as to be substantially parallel with the conveying direction of the sheet S.

The foil film F guided by the first guide shaft 41 is conveyed toward the transfer device 50 in a state in which the supported layer F2 (FIG. 1B) faces upward. The sheet S is superposed on the foil film F whose supported layer F2 faces upward, and the sheet S is then conveyed with the foil film F toward the transfer device 50.

The second guide shaft 42 is located downstream of the transfer device 50 in the conveying direction of the sheet S. The second guide shaft 42 changes the moving direction of the foil film F that has passed the transfer device 50 to a direction different from the conveying direction of the sheet S, thus permitting the foil film F to be peeled off from the sheet S.

The third guide shaft 43 is a member for defining the moving direction of the foil film F that is changed by the second guide shaft 42. Specifically, the third guide shaft 43 defines an angle of the foil film F when the foil film F is peeled off from the sheet S. (This angle will be hereinafter referred to as "separating angle" where appropriate.) Here, the separating angle is an angle formed by: a portion of the foil film F tensioned between the first guide shaft 41 and the second guide shaft 42; and a portion of the foil film F tensioned between the second guide shaft 42 and the third guide shaft 43. The third guide shaft 43 changes the moving direction of the foil film F guided by the second guide shaft 42 to thereby guide the foil film F to the take-up reel 35.

In a state in which the film unit FU is mounted on the foil transfer apparatus 1, the take-up reel 35 is driven and rotated counterclockwise in FIG. 1 by a motor 80 provided in the housing 2. When the take-up reel 35 rotates, the foil film F wound around the supply reel 31 is drawn. The foil film F drawn from the supply reel 31 is guided by the guide shafts 41-43 and is taken up around the take-up reel 35. Specifically, in a foil transfer operation, the foil film F is sent by a pressure roller 51 and a heating roller 61 (both of which will be described), so that the foil film F is drawn from the supply reel 31. The foil film F that has been sent by the pressure roller 51 and the heating roller 61 is taken up around the take-up reel 35.

The transfer device 50 is configured to transfer the transfer layer F22 onto the toner image formed on the sheet S by heating and pressurizing the sheet S and the foil film F that are superposed on each other. The transfer device 50 includes the pressure roller 51 (as one example of a pressurizing member) and the heating roller 61 (as one example of a heating member). The transfer device 50 heats and pressurizes the sheet S and the foil film F superposed on each other at a nip position between the pressure roller 51 and the heating roller 61.

The pressure roller 51 is a roller formed by covering the circumferential surface of a cylindrical core metal with a rubber layer formed of silicone rubber. The pressure roller 51 is disposed so as to be located on an upper side of the foil film F and is capable of contacting the back surface of the sheet S, i.e., the surface of the sheet S opposite to the front surface thereof on which the toner image is formed.

The pressure roller 51 is rotatably supported at opposite ends thereof by the cover 22. The pressure roller 51 cooperates with the heating roller 61 to nip the sheet S and the foil film F therebetween. The pressure roller 51 is driven and rotated by the motor 80 so as to rotate the heating roller 61.

The heating roller 61 is a roller constituted by a cylindrical metal pipe in which is disposed a heater. The heating roller 61 heats the foil film F and the sheet S. The heating roller 61 is disposed so as to be located on a lower side of the foil film F and is capable of contacting the foil film F. The heating roller 61 heats the foil film F and the sheet S. In the following explanation, a direction in which an axis, about which the heating roller 61 rotates, extends will be simply referred to as "axial direction".

The heating roller 61 is supported by a heating unit 6 so as to be rotatable and movable in the up-down direction. The heating unit 6 includes a roller-position change mechanism 7 configured to cause the heating roller 61 to come into contact with and move away from the foil film F. The heating unit 6 is disposed between the supply reel 31 and the take-up reel 35 in the conveying direction of the sheet S. In a state in which the cover 22 is closed, the roller-position change mechanism 7 causes the heating roller 61 to be moved to a contact position at which the heating roller 61 contacts the foil film F, at timing when the sheet S is supplied to the transfer device 50. In a case where the cover 22 is opened or in a case where the foil transfer operation is not performed on the sheet S by the transfer device 50, the roller-position change mechanism 7 causes the heating roller 61 to be kept located at a spaced position at which the heating roller 61 is spaced apart from the foil film F.

In the thus constructed foil transfer apparatus 1, the sheet S placed on the sheet tray 3 with the front surface thereof facing downward is conveyed by the sheet supply mechanism 11 toward the transfer device 50 The sheet S is superposed on the foil film F supplied from the supply reel 31 on the upstream side of the transfer device 50 in the conveying direction and is then conveyed to the transfer device 50 in a state in which the toner image of the sheet S and the foil film F are in contact with each other.

In the transfer device 50, when the sheet S and the foil film F pass the nip position between the pressure roller 51 and the heating roller 61, the sheet S and the foil film F are heated and pressurized by the heating roller 61 and the pressure roller 51, so that the foil (the supported layer F2) is transferred onto the toner image.

After the foil has been transferred, the sheet S and the foil film F are conveyed to the second guide shaft 42 in a state in which the sheet S and the foil film F are stuck to each other. When the sheet S and the foil film F pass the second guide shaft 42, the moving direction of the foil film F is changed to a direction different from the conveying direction of the sheet S, so that the foil film F is peeled off from the sheet S, namely, the supported layer F2 bonded to the toner image is peeled off from the supporting layer F1 of the foil film F.

The foil film F peeled off from the sheet S and including the supporting layer F1 that is peeled off from the supported layer F2 bonded to the toner image on the sheet S is taken up around the take-up reel 35. On the other hand, the sheet S from which the foil film F is peeled off is discharged by the sheet discharge mechanism 12 to outside the housing 2 in a state in which the front surface of the sheet S on which the foil has been transferred faces downward.

There will be next explained in detail the characterizing feature of the present embodiment, i.e., the roller-position change mechanism 7 of the heating unit 6.

Figure 3:
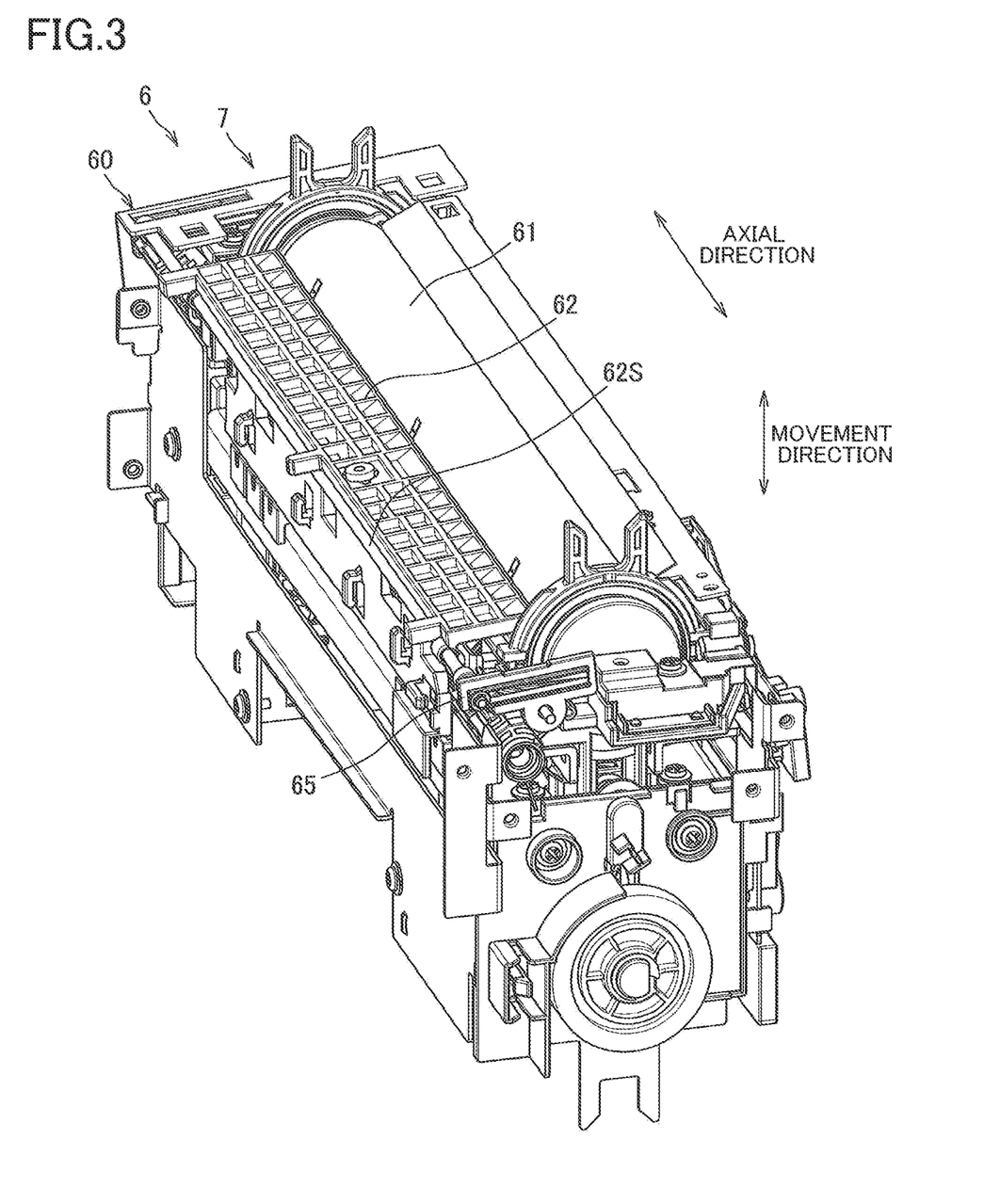
FIG. 3 is a perspective view of a heating unit in which a heating member is located at a contact position.
Figure 4:
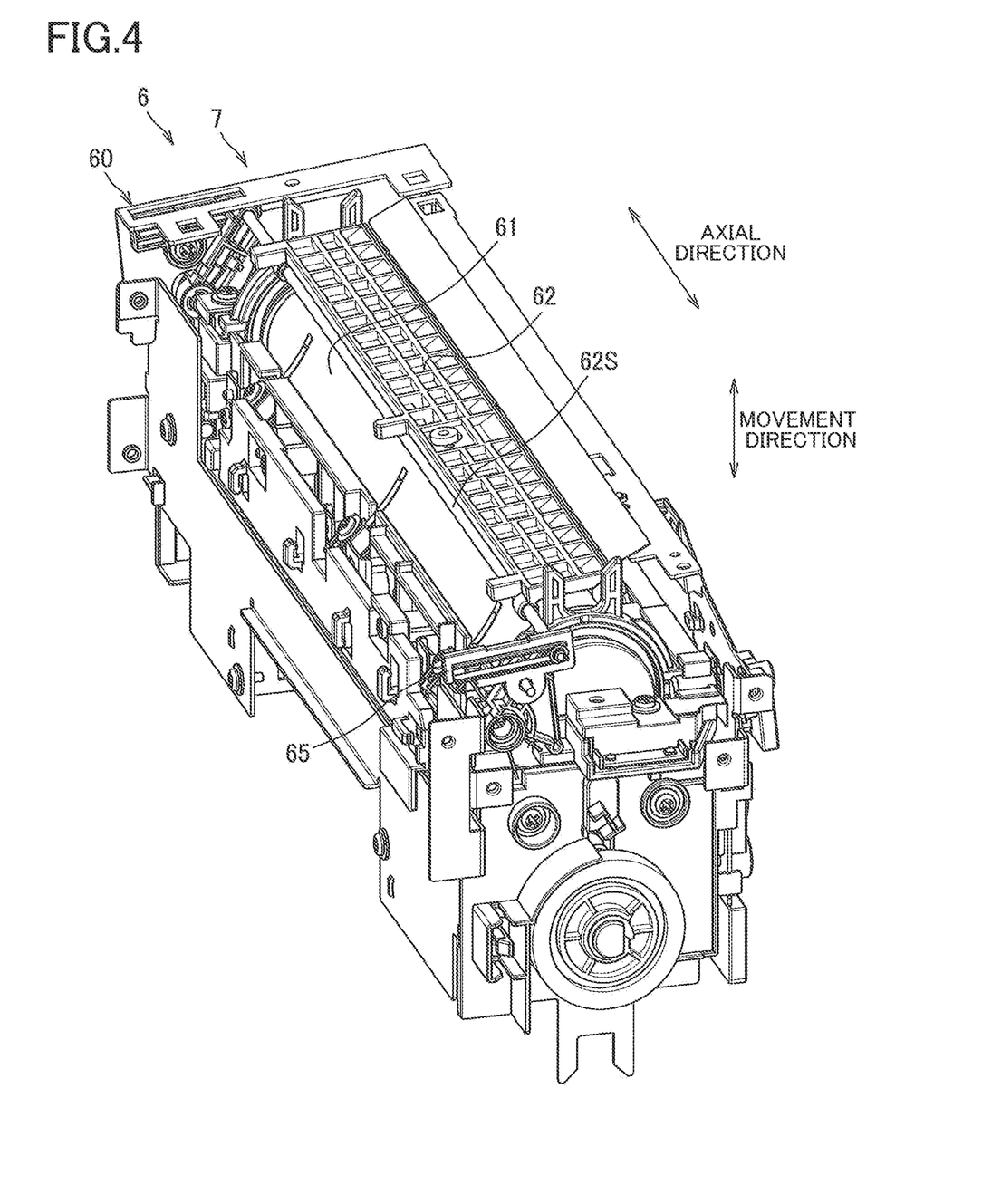
FIG. 4 is a perspective view of the heating unit in a state in which the heating member is located at a spaced position.

As illustrated in FIGS. 3 and 4, the heating unit 6 includes a fixed frame 60 in addition to the heating roller 61 and the roller-position change mechanism 7 described above. The fixed frame 60 constitutes an outer frame of the heating unit 6 and supports the roller-position change mechanism 7. The fixed frame 60 is fixed to the housing body 21.

The roller-position change mechanism 7 is configured to move the heating roller 61 between the contact position illustrated in FIG. 3 and the spaced position illustrated in FIG. 4. In other words, the heating roller 61 is moved by the roller-position change mechanism 7 in a direction in which the heating roller 61 and the pressure roller 51 are arranged (FIG. 1). In the following explanation, the direction in which the heating roller 61 moves will be simply referred to as "movement direction".

Figure 5:
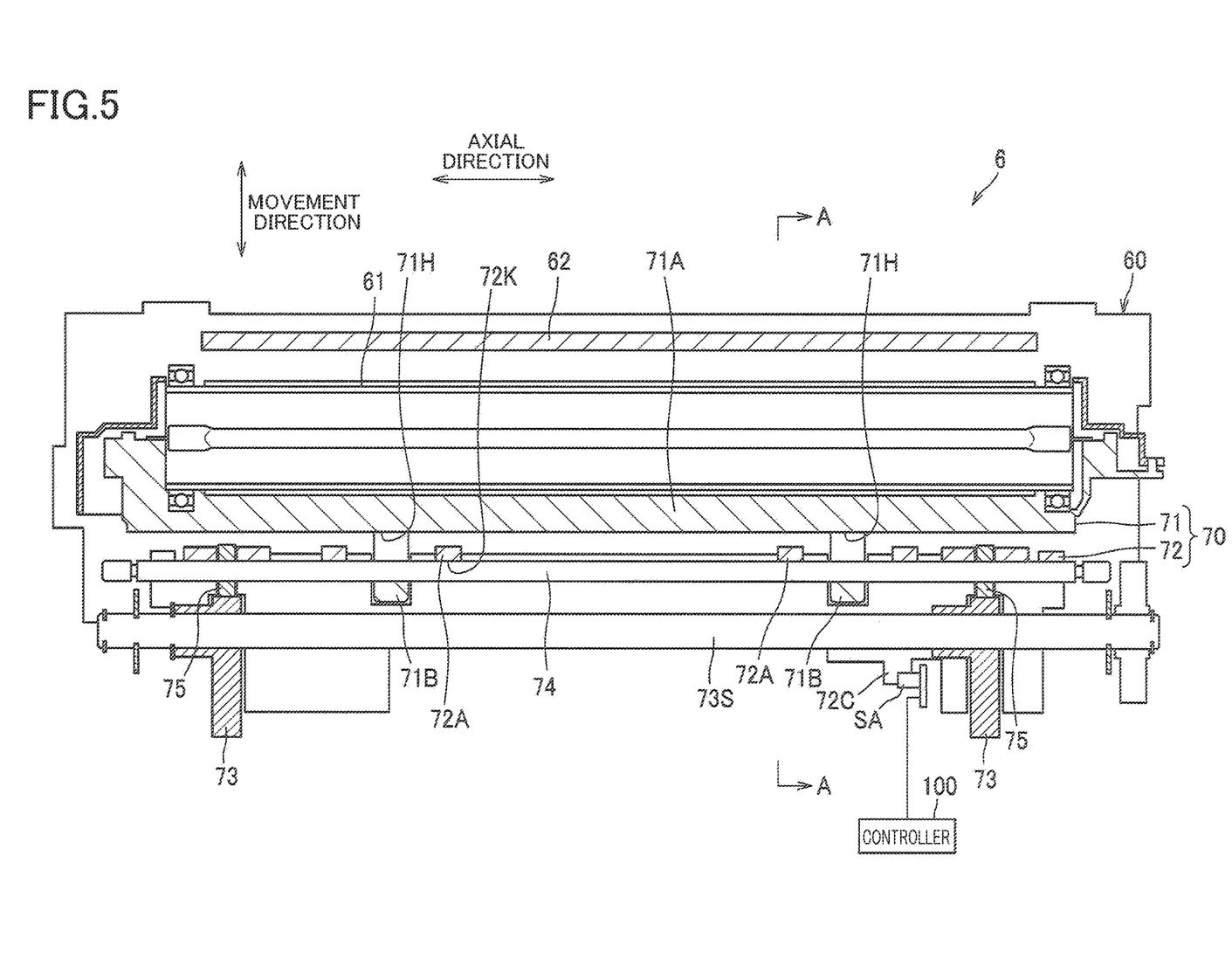
FIG. 5 is a cross-sectional view of the heating unit in the state in which the heating member is located at the spaced position, the view being viewed from a front side.
Figure 6:
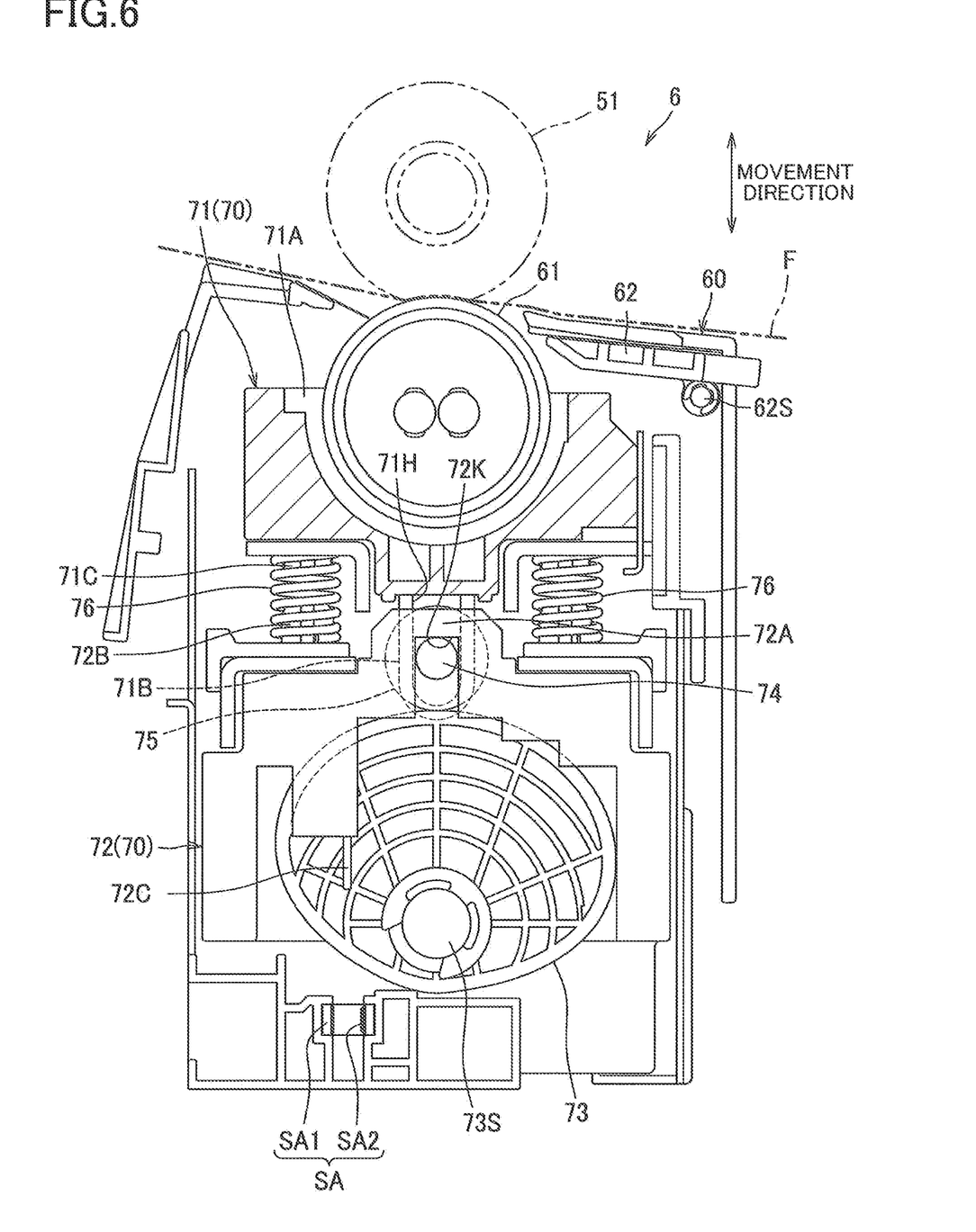
FIG. 6 is a cross-sectional view of the heating unit in the state in which the heating member is located at the contact position, the view being viewed in an axial direction.
Figure 7:
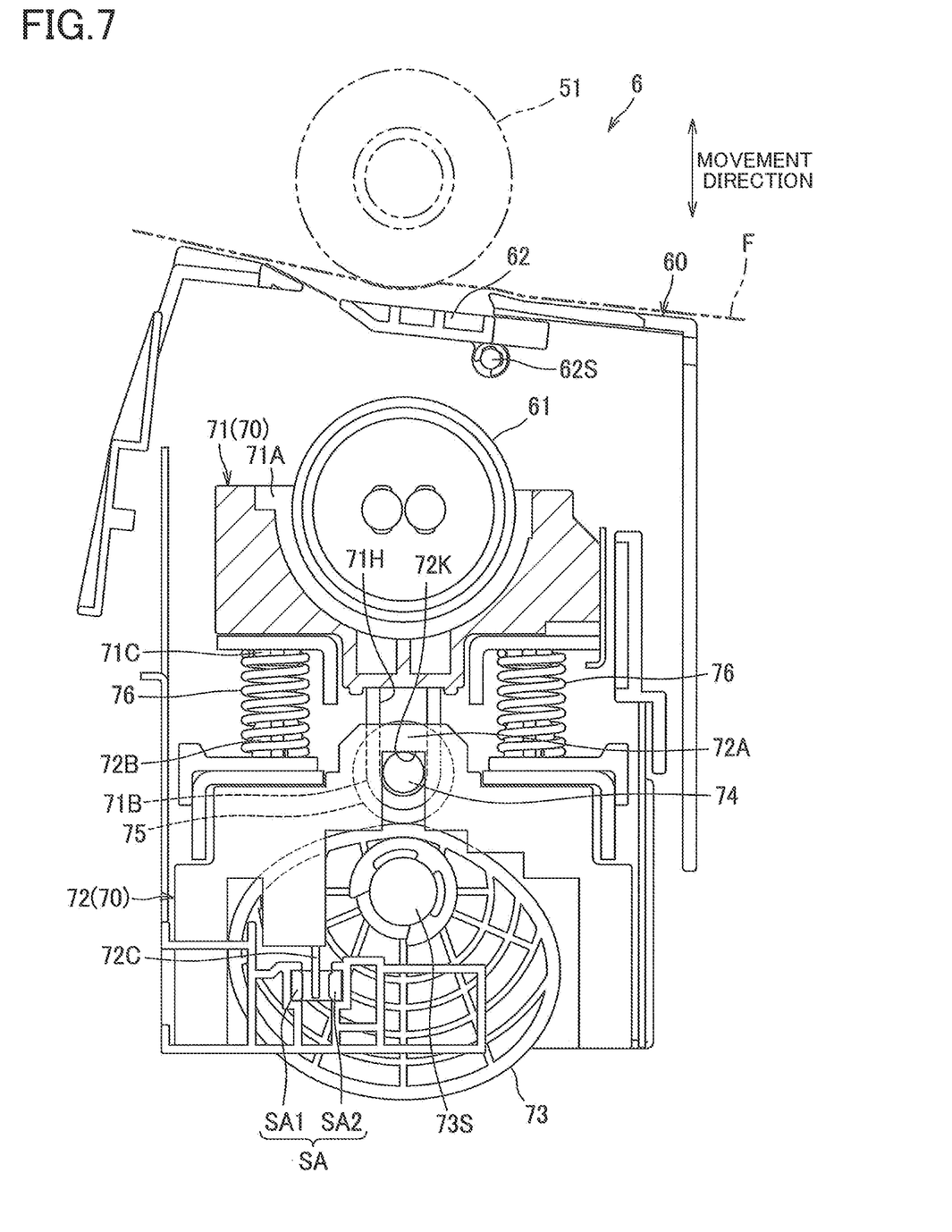
FIG. 7 is a cross-sectional view of the heating unit in the state in which the heating member is located at the spaced position, the view being viewed in the axial direction.

As illustrated in FIG. 5, the roller-position change mechanism 7 includes a movable frame 70 and cams 73. The movable frame 70 supports the heating roller 61. The movable frame 70 is slidably guided by a guide portion (not illustrated) of the fixed frame 60 so as to be movable between a first position illustrated in FIG. 6 and a second position illustrated in FIG. 7. As illustrated in FIG. 6, the first position is a position at which the heating roller 61 is in contact with the foil film F in a state in which the foil film F is mounted on the housing body 21. As illustrated in FIG. 7, the second position is a position at which the heating roller 61 is spaced apart from the foil film F in the state in which the foil film F is mounted on the housing body 21. It is noted that the direction in which the movable frame 70 moves between the first position and the second position is the same as the movement direction indicated above.

Each of the cams 73 is configured to move the movable frame 70. The cams 73 are disposed respectively at opposite end portions of a shaft 73S that extends in the axial direction. The shaft 73S is configured to be rotated by a drive source not illustrated. The rotation of the shaft 73S causes each cam 73 to be displaceable between a pushing position (FIG. 6) at which the cam 73 pushes the movable frame 70 and a release position (FIG. 7) at which the cam 73 does not push the movable frame 70.

When each cam 73 rotates from the release position to the pushing position, the movable frame 70 is pushed by each cam 73 and is moved from the second position to the first position. In a state in which the movable frame 70 is located at the first position, the heating roller 61 is located at the contact position.

When each cam 73 rotates from the pushing position to the release position, the movable frame 70 is not pushed by each cam 73 and is moved from the first position to the second position. In the present embodiment, when the cams 73 rotate to the respective release positions, the movable frame 70 moves from the first position to the second position by its own weight. In a state in which the movable frame 70 is located at the second position, the heating roller 61 is located at the spaced position.

As illustrated in FIG. 6, the movable frame 70 of the present embodiment is constituted by two frames arranged in the up-down direction. Specifically, the movable frame 70 includes a first frame 71 and a second frame 72. The roller-position change mechanism 7 further includes a connecting shaft 74, rollers 75, and springs 76.

As illustrated in FIG. 5, the connecting shaft 74 is a shaft extending in the axial direction and connects the first frame 71 and the second frame 72.

The rollers 75 are disposed respectively at opposite end portions of the connecting shaft 74 in the axial direction and are rotatable relative to the connecting shaft 74. Each roller 75 is a member configured to be pushed by the corresponding cam 73. When the rollers 75 are pushed by the corresponding cams 73, the connecting shaft 74 is moved with the rollers 75.

Figure 8:
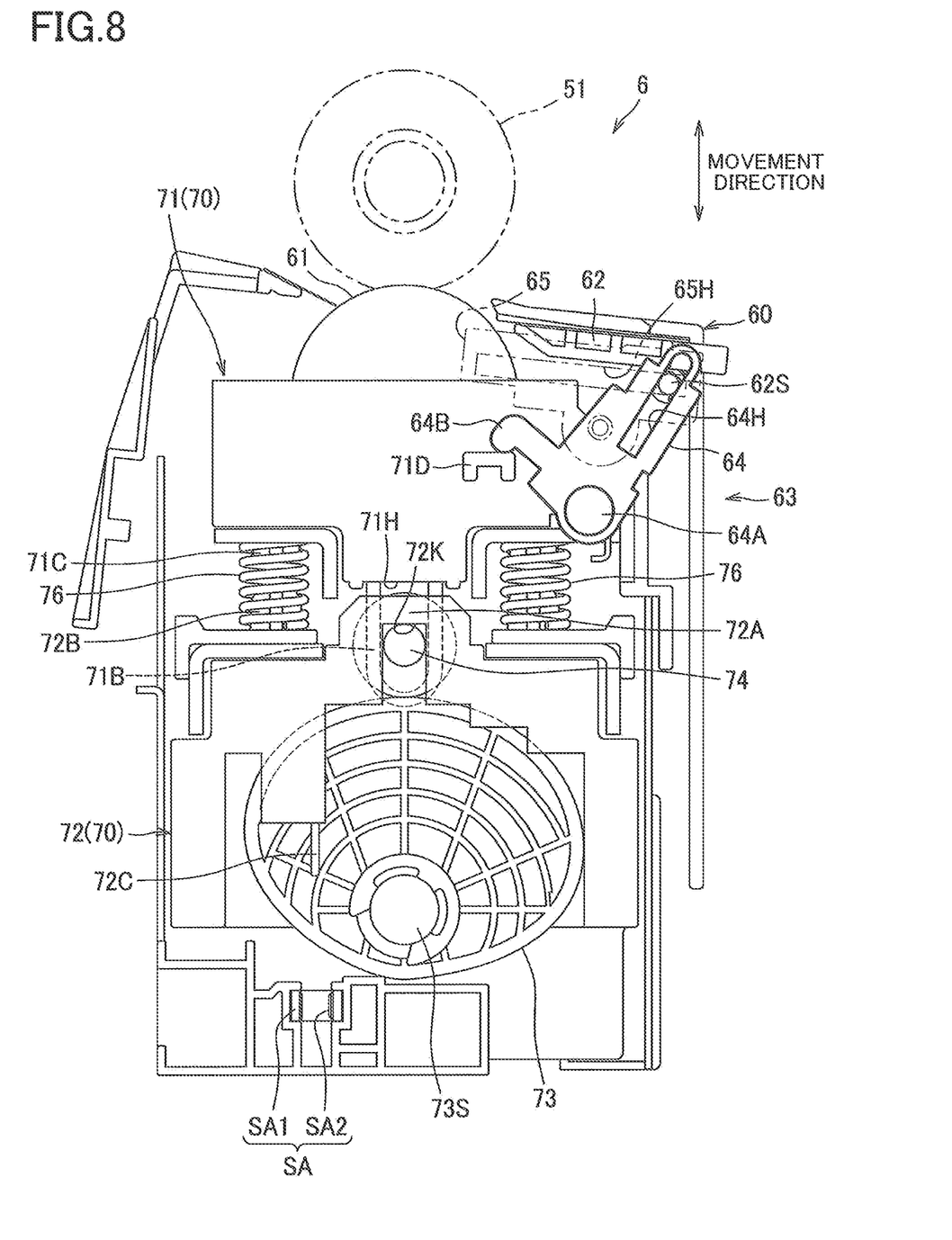
FIG. 8 is a view for explaining a shutter and a link mechanism in the state in which the heating member is located at the contact position.

The first frame 71 is located above the second frame 72. The first frame 71 includes a support portion 71A, connecting portions 71B, spring engaging portions 71C, and protrusions 71D (FIG. 8).

The support portion 71A is a portion for supporting the heating roller 61. The connecting portions 71B are portions for connecting the first frame 71 to the second frame 72 via the connecting shaft 74. Each connecting portion 71B has an elongate hole 71H in which the connecting shaft 74 is engaged. The elongate hole 71H is a long hole extending in the movement direction. Accordingly, the first frame 71 is slidably movable relative to the connecting shaft 74 in the movement direction. As illustrated in FIG. 8, each of the spring engaging portions 71C protrudes toward the second frame 72. Each spring engaging portion 71C is a portion that is in engagement with one of opposite ends of the corresponding spring 76. Each of the protrusions 71D protrudes toward one side in the axial direction. The protrusion 71D is a portion that pushes a corresponding one of links 64 (that will be described) when the first frame 71 moves from the second position to the first position.

The second frame 72 includes connecting portions 72A, spring engaging portions 72B, and a protrusion 72C.

Each of the connecting portions 72A is a portion that engages with the connecting shaft 74 for connecting the second frame 72 to the first frame 71 via the connecting shaft 74. Each connecting portion 72A has a cutout 72K in which the connecting shaft 74 is engaged from the lower side. Accordingly, the second frame 72 is slidably movable relative to the connecting shaft 74 in the movement direction. Each spring engaging portion 72B protrudes toward the first frame 71. Each spring engaging portion 72B is a portion that is in engagement with the other of the opposite ends of the corresponding spring 76. The protrusion 72C extends in the movement direction. In the present embodiment, the protrusion 72C is located at a lower end of the second frame 72 so as to extend downward. The protrusion 72C is a portion utilized in detecting the position of the movable frame 70 by a sensor SA that will be described.

As illustrated in FIG. 6, the springs 76 are disposed between the first frame 71 and the second frame 72. Each spring 76 is one example of an elastically support member, in other words, an urging member. In the present embodiment, each spring 76 is a compression spring, and a plurality of springs 76 are provided in the present foil transfer apparatus 1. The first frame 71 and the second frame 72 are slidably movable relative to the connecting shaft 74 in the movement direction and are urged by the springs 76 in a direction in which the first frame 71 and the second frame 72 are spaced apart from each other.

When the cams 73 rotate from the respective release positions to the respective pushing positions, the cams 73 push up the corresponding rollers 75, so that the connecting shaft 74 is pushed up and the connecting shaft 74 accordingly pushes the connecting portions 72A of the second frame 72. Thus, the connecting shaft 74 moves the second frame 72 upward. When the second frame 72 moves upward, the first frame 71 is pushed upward via the springs 76. Thus, the first frame 71 and the second frame 72 are moved from the second position to the first position.

As illustrated in FIG. 7, when the cams 73 rotate from the respective pushing positions to the respective release positions, the cams 73 do not push up the corresponding rollers 75. Because the connecting shaft 74 does not push the second frame 72 in this state, the springs 76 urge the first frame 71 and the second frame 72 in the direction in which the first frame 71 and the second frame 72 are spaced apart from each other, so that the first frame 71 and the second frame 72 move away from each other. The connecting shaft 74 then comes into contact with a lower end of each elongate hole 71H of the first frame 71, and the first frame 71 and the second frame 72 no longer move away from each other. The first frame 71 and the second frame 72 move from the first position to the second position by their own weights.

Figure 9:
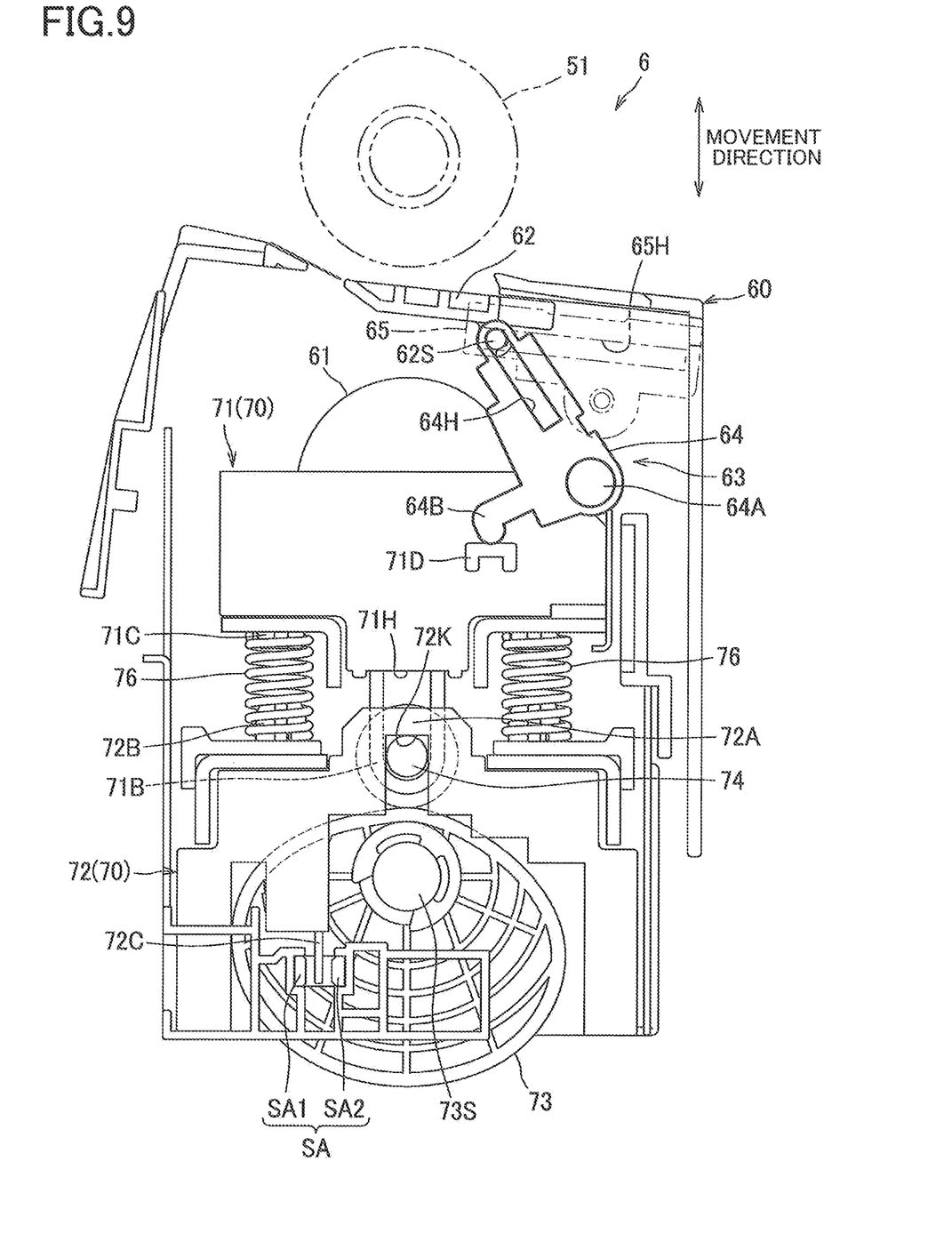
FIG. 9 is a view for explaining the shutter and the link mechanism in the state in which the heating member is located at the spaced position.

As illustrated in FIGS. 8 and 9, the heating unit 6 further includes the sensor SA, a shutter 62, and link mechanisms 63.

The sensor SA is fixed to the fixed frame 60. The sensor SA is an optical sensor configured to detect the position of the movable frame 70. The sensor SA detects the position of the protrusion 72C to thereby detect the position of the movable frame 70. The sensor SA is connected to the controller 100 (FIG. 5).

Specifically, the sensor SA includes a light emitting portion SA1 and a light receiving portion SA2 that is opposed to the light emitting portion SA1.

As illustrated in FIG. 6, when the movable frame 70 is located at the first position, the protrusion 72C is not located between the light emitting portion SA1 and the light receiving portion SA2. In this case, the light receiving portion SA2 detects light emitted from the light emitting portion SA1. Accordingly, the controller 100 determines that the movable frame 70 is located at the first position.

As illustrated in FIG. 7, when the movable frame 70 is located at the second position, the protrusion 72C is located between the light emitting portion SA1 and the light receiving portion SA2. In this case, the light receiving portion SA2 does not detect light emitted from the light emitting portion SA1. Accordingly, the controller 100 determines that the movable frame 70 is located at the second position.

The shutter 62 is provided at an upper end portion of the heating unit 6 so as to be slidably movable between a closed position and an open position. When the shutter 62 is moved, it is guided by the fixed frame 60. The shutter 62 includes a shaft 62S that extends in the axial direction. The shaft 62S is in engagement with the link mechanisms 63.

As illustrated in FIG. 3, when the heating roller 61 is located at the contact position, the shutter 62 is located at the open position (as a second shutter position) that is a position different from a position between the heating roller 61 and the pressure roller 51.

As illustrated in FIG. 4, when the heating roller 61 is located at the spaced position, the shutter 62 is located at the closed position (as a first shutter position) that is the position between the pressure roller 51 and the heating roller 61 to cover the heating roller 61.

Each of the link mechanisms 63 is a mechanism for moving the shutter 62 in conjunction with the movement of the movable frame 70. Specifically, as illustrated in FIG. 9, when the movable frame 70 is moved from the first position to the second position, the link mechanisms 63 cause the shutter 62 to be moved from the open position to the closed position. As illustrated in FIG. 8, when the movable frame 70 is moved from the second position to the first position, the link mechanisms 63 cause the shutter 62 to be moved from the closed position to the open position.

Each link mechanism 63 includes the link 64 and a shutter guide 65. The following explanation will be made focusing on one of the link mechanisms 63.

The link 64 is swingably supported by the fixed frame 60. That is, the link 64 is swingably supported by the housing body 21 via the fixed frame 60. The link 64 is swingable between a third position illustrated in FIG. 8 and a fourth position illustrated in FIG. 9. The link 64 has a shaft 64A, an arm 64B, and an elongate hole 64H. The link 64 is always urged by a torsion spring (not illustrated) toward the fourth position, namely, in a direction in which the shutter 62 is closed.

The shaft 64A is supported by the fixed frame 60. The link 64 swings about the axis of the shaft 64A. The arm 64B is a portion that is in contact with the corresponding protrusion 71D of the first frame 71. The shaft 62S of the shutter 62 is engaged in the elongate hole 64H.

The shutter guide 65 is fixed to the fixed frame 60 and has an elongate hole 65H. The elongate hole 65H guides the movement of the shaft 62S of the shutter 62.

As illustrated in FIG. 8, when the movable frame 70 moves from the second position to the first position, the protrusion 71D pushes up the arm 64B, and the link 64 swings from the fourth position to the third position. The link 64 then moves the shaft 62S that is engaged in the elongate hole 64H, whereby the shutter 62 is moved from the closed position to the open position.

As illustrated in FIG. 9, when the movable frame 70 moves from the first position to the second position, the protrusion 71D does not push up the arm 64B, and the link 64 swings from the third position to the fourth position by the torsion spring. The link 64 then moves the shaft 62S that is engaged in the elongate hole 64H, whereby the shutter 62 is moved from the open position to the closed position.

As described above, the link 64 is in engagement with the movable frame 70 and the shutter 62. The link 64 swings when the movable frame 70 moves from the second position to the first position, so as to move the shutter 62 from the closed position to the open position.

Figure 10:
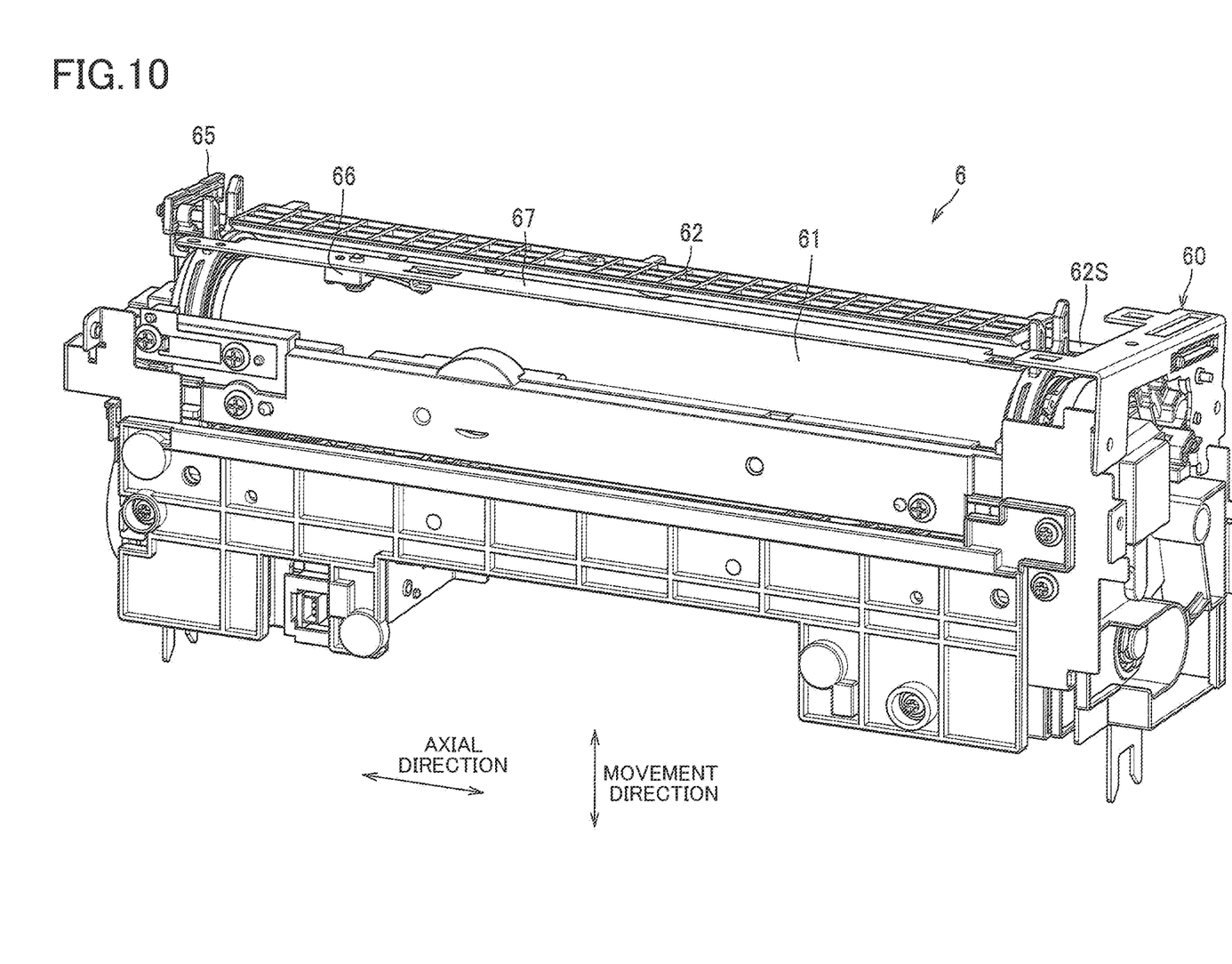
FIG. 10 is a perspective view of the heating unit for explaining a position of a thermistor, the view being viewed in a direction different from that in FIG. 4.

Referring to FIG. 10, there will be explained a thermistor 66 provided in the heating unit 6. As illustrated in FIG. 10, the heating unit 6 further includes the thermistor 66 and a metal plate 67 that extends in the axial direction.

The thermistor 66 is a temperature sensor for estimating the temperature of the shutter 62. The thermistor 66 is connected to the controller 100.

Specifically, the thermistor 66 is not in contact with the shutter 62 that is formed of a resin but is disposed so as to be in contact with the metal plate 67. The metal plate 67 extends in the axial direction and has a dimension in the axial direction that is larger than a maximum width of the sheet S on which the foil transfer apparatus 1 performs the foil transfer operation. It is noted that a distance between the heating roller 61 and the thermistor 66 and a distance between the heating roller 61 and the shutter 62 are substantially the same.

In the present embodiment, in a case where the temperature detected by the thermistor 66 is higher than a predetermined temperature, the controller 100 activates an interlock switch (not illustrated) to prohibit the cover 22 from being opened.

The configuration according to the illustrated embodiment enjoys the following advantages.

In the foil transfer apparatus including the heating roller 61 that is movable between the contact position at which the heating roller 61 is in contact with the foil film F and the spaced position at which the heating roller 61 is spaced apart from the foil film F, the heating roller 61 fails to move in some cases even though the cams move. In such a case, even if the sensor detects the phase of the cams that move the heating roller 61, the position of the heating roller 61 cannot be accurately detected.

In the foil transfer apparatus 1 according to the present embodiment, the sensor SA detects the position of the movable frame 70 supporting the heating roller 61, so that the position of the heating roller 61 can be accurately detected.

The movable frame 70 supporting the heating roller 61 moves from the second position to the first position by being pushed by the cams 73 and moves from the first position to the second position by its own weight. This configuration eliminates a member for moving the movable frame 70 from the first position to the second position, resulting in a reduction of the number of components.

The foil transfer apparatus 1 includes the link mechanisms 63 each configured to move the shutter 62 to the first shutter position between the heating roller 61 and the pressure roller 51 when the movable frame 70 moves from the first position to the second position and to move the shutter 62 to the second shutter position different from the position between the heating roller 61 and the pressure roller 51 when the movable frame 70 moves from the second position to the first position. With this configuration, the link mechanisms 63 cause the shutter 62 to cover the heating roller 61 when the movable frame 70 moves to the second position, and the shutter 62 does not hinder nipping by the heating roller 61 and the pressure roller 51 when the movable frame 70 moves to the first position.

The heating unit 6 includes the first frame 71 supporting the heating roller 61, the second frame 72 configured to be pushed by the cams 73, and the springs 76 disposed between the first frame 71 and the second frame 72. With this configuration, the second frame 72 pushed by the cams 73 pushes the first frame 71 via the springs 76, thus preventing the heating roller 61 from being pushed more than needed.

In a case where the sheets S used in the foil transfer apparatus 1 have various sizes and the area over which the sheet S is conveyed differs among the sheets S, there may be generated imbalances in the temperature distribution of the shutter 62 in the axial direction. In the present embodiment, the thermistor 66 detects the temperature of the metal plate 67 that is good in heat conductivity, so that the temperature of the shutter 62 is estimated. With this configuration, the temperature of the shutter 62 can be appropriately estimated without providing a plurality of thermistors.

It is to be understood that the present disclosure is not limited to the details of the illustrated embodiment but may be embodied in various forms described below, for instance.

In the illustrated embodiment, the movable frame 70 moves from the second position to the first position by being pushed by the cam 73. The present disclosure is not limited to this configuration. The movable frame 70 may move from the second position to the first position by being pushed by other member such as a solenoid actuator.

In the illustrated embodiment, the movable frame 70 moves from the first position to the second position by its own weight. The present disclosure is not limited to this configuration. The movable frame 70 may move from the first position to the second position by an urging member such as a spring.

In the illustrated embodiment, the movable frame supporting the heating roller 61 is constituted by the two frames. The movable frame may be constituted by a single frame or at least three frames.

In the illustrated embodiment, the springs 76, each as one example of the elastically support member (the urging member), disposed between the first frame 71 and the second frame 72 are the compression springs. The elastically support members may be other springs such as leaf springs or torsion springs or may be rubber or sponge.

In the illustrated embodiment, the pressure roller 51 is illustrated as the pressurizing member, and the heating roller 61 is illustrated as the heating member. The present disclosure is not limited to this configuration. For instance, the pressurizing member may be a pad or the like that cooperates with the heating roller to nip the sheet and the foil film therebetween. The heating member may be a plate-like member that cooperates with the pressure roller to nip the sheet and the foil film therebetween.

In the illustrated embodiment, the second guide shaft 42 shaped like a roller is illustrated as the separating member. The present disclosure is not limited to this configuration. The separating member may be a blade shaped like a plate, for instance.

In the illustrated embodiment, the third guide shaft 43 shaped like a roller is illustrated as the angle defining member. The present disclosure is not limited to this configuration. The angle defining member may be a blade shaped like a plate, for instance.

In the illustrated embodiment, the supply reel 31 and the take-up reel 35 constitute a foil-transfer film cartridge FC. The present disclosure is not limited to this configuration. For instance, the foil-transfer film cartridge may include the supply reel, and the take-up reel may be provided in the housing.

In the illustrated embodiment, the foil transfer apparatus is configured to transfer the foil onto the toner image formed on the sheet. The present disclosure is not limited to this configuration. The foil transfer apparatus may be any apparatus provided that the apparatus is configured to transfer the foil to the sheet.

In the illustrated embodiment, the foil film F is constituted by the four layers. The present disclosure is not limited to this configuration. The number of layers that constitute the foil film may be optional provided that the foil film includes the transfer layer and the supporting layer.

In the illustrated embodiment, the film unit is constituted by the foil-transfer film cartridge and a holder holding the foil-transfer film cartridge. The present disclosure is not limited to this configuration. The film unit need not necessarily include the holder. The holder may undetachably support the foil-transfer film cartridge.

The transfer device 50 in the illustrated embodiment includes the pressure roller 51 and the heating roller 61, and the sheet S and the foil film F are superposed on each other at the nip position between the pressure roller 51 and the heating roller 61. There may be employable what is called film fixation in which the sheet passes between the pressure roller and a heated fixation film. Further, a nip position may be defined between the pressure roller and a heater, and a belt may be interposed between the pressure roller and the heater. The sheet placed on the belt may pass the thus defined nip position.

In the illustrated embodiment, the heating roller 61 is configured to be movable. The pressure roll 51 may be configured to be movable.

The present disclosure may be embodied by optionally combining the elements described in the embodiment and the modifications.

What is claimed is:

1. A foil transfer apparatus configured to superpose a sheet on a foil film including foil and to transfer the foil to the sheet, comprising:
   a housing body;
   a heating member configured to heat the foil film and the sheet;
   a pressurizing member configured to cooperate with the heating member to nip the foil film and the sheet therebetween;
   a movable frame supporting one of the heating member and the pressurizing member, the movable frame being movable between (i) a first position at which the one of the heating member and the pressurizing member is located at a contact position at which the one of the heating member and the pressurizing member is in contact with the foil film in a state in which the foil film is mounted on the housing body, and (ii) a second position at which the one of the heating member and the pressurizing member is located at a spaced position at which the one of the heating member and the pressurizing member is spaced apart from the foil film in the state in which the foil film is mounted on the housing body;

a cam configured to move the movable frame between the first position and the second position; and a sensor configured to detect a position of the movable frame, wherein the movable frame includes a first frame and a second frame, the first frame being located above the second frame and supporting the one of the heating member and the pressurizing member, wherein the sensor is configured to detect a position of the second frame, wherein the first frame includes a first connecting portion in which an elongate hole is formed, and the second frame includes a second connecting portion in which a cutout is formed, and wherein the foil transfer apparatus further comprises a connecting shaft configured to connect the first frame and the second frame in a state in which the connecting shaft is disposed in the elongate hole of the first frame and disposed in the cutout of the second frame, wherein the connecting shaft is movable in the elongate hole between (v) a fifth position at which the connecting shaft is in contact with a contacting portion at the lower end of the elongate hole when the movable frame is positioned at the second position, and (vi) a sixth position at which the connecting shaft is spaced apart from the lower end of the elongate hole when the movable frame is positioned at the first position.

2. The foil transfer apparatus according to claim 1, wherein the movable frame moves from the second position to the first position by being pushed by the cam, and moves from the first position to the second position by its own weight.

3. The foil transfer apparatus according to claim 2, further comprising:

a shutter configured to cover the heating member; and a link movable between (iii) a third position and (iv) a fourth position, the link being configured to move the shutter to a first shutter position between the heating member and the pressurizing member when the movable frame moves from the first position to the second position, so that the link moves from the third position to the fourth position, and move the shutter to a second shutter position, which is different from the first shutter position between the heating member and the pressurizing member, when the movable frame moves from the second position to the first position, so that the link moves from the fourth position to the third position.

4. The foil transfer apparatus according to claim 3, wherein the link is movably supported by the housing body, wherein the link is in engagement with the movable frame and the shutter, and wherein, when the movable frame moves from the second position to the first position, the link swings to cause the shutter to be moved from the position between the heating member and the pressurizing member to the position different from the position between the heating member and the pressurizing member.

5. The foil transfer apparatus according to claim 4, wherein the first frame includes a protrusion, wherein the link includes an arm, and wherein when the movable frame moves from the second position to the first position, the protrusion of the first frame pushes up the arm, and the link moves from the fourth position to the third position.

6. The foil transfer apparatus according to claim 4, wherein the link is swingable between the third position and the fourth position.

7. The foil transfer apparatus according to claim 3, wherein the link further includes a shutter guide fixed to the housing body, the shutter guide guiding the shutter so that the shutter moves between the first shutter position and the second shutter position.

8. The foil transfer apparatus according to claim 1, wherein the second frame includes a protrusion, wherein the sensor includes a light emitting portion and a light receiving portion that is opposed to the light emitting portion, wherein the protrusion is located between the light emitting portion and the light receiving portion when the movable frame is located at the second position, and wherein the protrusion is not located between the light emitting portion and the light receiving portion when the movable frame is located at the first position.

9. The foil transfer apparatus according to claim 8, wherein the protrusion extends in a direction in which the movable frame moves between the first position and the second position.

10. The foil transfer apparatus according to claim 8, wherein the first frame supports the heating member, the second frame being configured to be pushed by the cam and connected to the first frame to be movable relative to the first frame, and an elastic support member is disposed between the first frame and the second frame.

11. The foil transfer apparatus according to claim 10, wherein the protrusion is provided on the second frame.

12. The foil transfer apparatus according to claim 1, wherein the heating member is a heating roller.

13. The foil transfer apparatus according to claim 1, wherein the pressurizing member is a pressure roller.

14. The foil apparatus according to claim 1, wherein the sensor includes a light emitting portion and a light receiving portion that is opposed to the light emitting portion.

15. The foil transfer apparatus according to claim 1, wherein the connecting shaft is movable with respect to the first frame and the second frame when the movable frame moves between the first position the second position in the state in which the connecting shaft is disposed in the elongate hole of the first frame and the cutout of the second frame.

* * * * *